(12) United States Patent
Tokushima

(10) Patent No.: US 6,621,644 B2
(45) Date of Patent: Sep. 16, 2003

(54) OPTICAL WAVELENGTH-DEMULTIPLEXER WITH AN IMPROVED OPTICAL LENS

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/212,231

(22) Filed: Aug. 6, 2002

(65) Prior Publication Data

US 2003/0035227 A1 Feb. 20, 2003

(30) Foreign Application Priority Data

Aug. 6, 2001 (JP) ........................................ 2001-237974

(51) Int. Cl.[7] .................................................. G02B 3/00
(52) U.S. Cl. ........................ 359/737; 359/124; 359/721
(58) Field of Search ................................ 359/115, 124, 359/127–131, 2, 41, 290, 291, 298, 558, 618, 619, 642, 721, 737, 117, 238, 707, 732; 385/123, 125, 34, 16, 17, 18, 37, 35, 36, 47, 140; 250/214.1

(56) References Cited

U.S. PATENT DOCUMENTS

| 5,050,954 A | * | 9/1991 | Gardner et al. ................ 385/16 |
| 5,774,607 A | * | 6/1998 | Shiraishi et al. ............... 385/33 |
| 6,381,389 B1 | * | 4/2002 | Kosaka ......................... 385/39 |

FOREIGN PATENT DOCUMENTS

JP         A 11-271541        10/1999

OTHER PUBLICATIONS

Takahashi et al., Electric Information Communication Association, Spring Meeting, 1992, p. 272.

* cited by examiner

Primary Examiner—Jordan M. Schwartz
Assistant Examiner—Jessica Stultz
(74) Attorney, Agent, or Firm—Young & Thompson

(57) ABSTRACT

An optical wavelength demultiplexer includes an optical lens, a first-side waveguide and a plurality of second-side waveguide. The lens has a wave number distribution-surface having a section where an angular frequency is constant, and said section having a shape which generally represents at least a part of an ellipse or a circle; a medium allowing group-velocity directions toward an inside of the section to allow said medium to exhibit a lens effect; a finite thickness defined by a distance between two parallel planarized surfaces of the medium; a first focusing point at an inside position of the lens; and a second focusing point at an outside position of the lens. The first-side waveguide is positioned for incidence of a wavelength-multiplexed optical signal into the lens. The plurality of second-side waveguide is so aligned that terminals thereof are positioned at respective focusing points of respectively different-wavelength components included in the wavelength-multiplexed optical signal.

29 Claims, 12 Drawing Sheets

OPTICAL WAVELENGTH-DEMULTIPLEXER WITH AN IMPROVED OPTICAL LENS

BACKGROUND OF THE INVENTION

1. Field of the Invention

The present invention relates to an optical device for wavelength-demultiplexing, and more particularly to an improved structure of an optical wavelength-demultiplexer and a lens used therefor.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

A wavelength multiplexing optical communication system is suitable for transmit a large quantity of optical signals via an optical waveguide such as an optical fiber, wherein a wavelength-multiplexed optical signal is transmitted through a single waveguide. The wavelength-multiplexed optical signal may thus include multiplexed different wavelengths. An optical signal transmitter performs a wavelength-multiplexing and transmits the wavelength-multiplexed optical signal. An optical signal receiver receives the transmitted wavelength-multiplexed optical signal and performs a wavelength-demultiplexing of the signal. The wavelength-demultiplexing divides the wavelength-multiplexed optical signal into plural wavelength-different signal components. An optical device performing the wavelength-multiplexing may be so called as a wavelength-multiplexer. An optical device performing the wavelength-demultiplexing may be so called as a wavelength-demultiplexer.

The wavelength-demultiplexer may generally have the same structure as the wavelength-multiplexer, wherein both are opposite to each other in input and output sides for optical signal. Namely, the wavelength-demultiplexer/multiplexer is an optical device which has a wavelength-demultiplexing/multiplexing structure, wherein input and output sides are inverted between the demultiplexer and the multiplexer.

For convenience, the following descriptions will be made by taking a typical example that the wavelength-demultiplexer/multiplexer be used as a wavelength-demultiplexer or a wavelength-divider for demultiplexing or dividing the wavelength-multiplexed optical signal into plural wavelength-different signal components. It is apparent to a person having ordinary skill in the art, to which the invention pertains, that although the following descriptions will focus onto the wavelength-demultiplexer, application thereof to the wavelength-multiplexer is possible.

One of the highly attracted wavelength-demultiplexers is an arrayed waveguide grating (AWG) wavelength-demultiplexer. This arrayed waveguide grating wavelength-demultiplexer may be formed over a semiconductor substrate such as a silicon substrate. The arrayed waveguide grating wavelength-demultiplexer has an arrayed waveguide grating structure, wherein a plurality of optical waveguide is arrayed as adjacent two being closely to each other as suitable. The number of the optical waveguide is the same as or more than the number of different wavelengths. If the substrate comprises silicon, then the waveguides may comprise silica-based waveguides.

As the wavelength-multiplexed optical signal is transmitted or propagated through one waveguide in the arrayed waveguide grating structure, with a gradual or gentle propagation in optical energy from the propagating wavelength-multiplexed optical signal into adjacent waveguides to the above signal-propagating-waveguide. A propagating distance or a coupling length, which is defined to be such a length or a distance that the optical signal transmission or propagation at this length or distance would give rise to the completion of the propagation or transfer of the optical energy into the adjacent waveguides. This propagating distance or coupling length depends upon the wavelength of the propagating optical signal. For those reasons, a variety in propagating-length of respective waveguides included in the arrayed waveguide grating structure would give rise to the wavelength-demultiplexing.

It is, however, difficult for the arrayed waveguide grating wavelength-demultiplexer to realize a desired size-down to less than a few centimeters square for the following reasons. The arrayed waveguide grating structure may generally comprise silica-based waveguides. For these silica-based waveguides, it is difficult to realize a small curvature radius of not larger than approximately 1 centimeters. The curved structure of the respective waveguides included in the arrayed waveguide grating structure is necessary for providing a variety in propagating length of the respective waveguides in accordance with respective coupling lengths for respective wavelengths. The undesirable limitation to the above-described minimum curvature radius provides a limitation to the size-down of the arrayed waveguide grating wavelength-demultiplexer. Takahashi et al. 1992 in Electric Information Communication Association, Spring Meeting, p. 272 disclose a conventional arrayed waveguide grating wavelength-demultiplexer which has an arrayed waveguide grating of forty one waveguides with 1.5 micrometers wavelength band, a 10 GHz frequency interval and eleven channels. A substrate size is 4 cm×6 cm.

Kosaka et al. proposed a conventional wavelength demultiplexer/multiplexer utilizing a photonic crystal for having attempted to solve the above issue of the limitation to the further device size down. This conventional wavelength demultiplexer/multiplexer is disclosed as a wavelength demultiplexing circuit in Japanese laid-open patent publication No. 11-271541. The photonic crystal is an artificial optical crystal which is designed to provide a periodic variation in dielectric constant. A kind of the photonic crystal has a specific wavelength band, in which a slight wavelength variation causes a relatively large variation in angle of refraction. Kosaka et al. utilized this property of the photonic crystal. Incidence of the wavelength-multiplexed optical signal into the photonic crystal causes that the wavelength different components multiplexed in the optical signal show respective different refractions to different directions, so that the differently refracted wavelength different components are received by different waveguides.

Kosaka et al. stated that the use of the photonic crystal of 1 mm-length or size allows a spectrum distribution of a 20 nm wavelength band in 1.5 micrometers-band over a distance of 500 micrometers at an output-side facet of the photonic crystal. An alignment of optical fibers at 125 micrometers pitch on the output-side facet of the photonic crystal may realize a wavelength-demultiplexer for five wavelengths or five channels. Another alignment of optical waveguides at 25 micrometers pitch on the output-side facet of the photonic crystal may realize another wavelength-demultiplexer for twenty five wavelengths or twenty five channels.

The above-described conventional wavelength-demultiplexer proposed by Kosaka et al. is to merely utilize the specific property of the photonic crystal that the slight wavelength difference causes a larger difference in angle of the refraction. FIG. 1 is a schematic diagram illustrative of an optical mechanism of the conventional wavelength-demultiplexer proposed by Kosaka et al. A light beam 69 is transmitted from a waveguide 68 and then incident into a photonic crystal 67. The light beam 69 as incident into the photonic crystal 67 is then split or divided into transmitting beams 70 and 71 differing in wavelength. As the isolated or split beams 70 and 71 propagate in the photonic crystal 67, respective beam diameters are gradually or gently increased. These gradual or gentle increases in the beam diameters of the isolated or split beams 70 and 71 may cause a partial overlap between the isolated or split beams 70 and 71. This partial overlap between the isolated or split beams 70 and 71 causes that the respective waveguides receive not only the target beam but also a part of the non-target beam, thereby causing an undesirable cross-talk between the target and non-target beams.

In the above circumstances, the development of a novel optical wavelength demultiplexer free from the above problems is desirable.

SUMMARY OF THE INVENTION

Accordingly, it is an object of the present invention to provide a novel optical device serving as at least a wavelength demultiplexer free from the above problems with the beam spread.

It is a further object of the present invention to provide a novel optical device serving as at least a wavelength demultiplexer with a high wavelength-resolution.

It is a still further object of the present invention to provide a novel optical lens to be used for an optical device serving as at least a wavelength demultiplexer free from the above problems with the beam spread.

It is yet a further object of the present invention to provide a novel optical lens to be used for an optical device serving as at least a wavelength demultiplexer with a high wavelength-resolution.

It is an additional object of the present invention to provide a novel variable-wavelength selective filter free from the above problems with the beam spread.

It is a further additional of the present invention to provide a novel variable-wavelength selective filter with a high wavelength-resolution.

The present invention provides an optical wavelength demultiplexer including at least an optical lens, at least a first-side waveguide and a plurality of second-side waveguide. The at least optical lens has a wave number distribution-surface having a section where an angular frequency is constant, and the section having a shape which generally represents at least a part of an ellipse or a circle; a medium allowing group-velocity directions toward an inside of the section to allow said medium to exhibit a lens effect; a finite thickness defined by a distance between two parallel planarized surfaces of the medium; a first focusing point at an inside position of the lens; and a second focusing point at an outside position of the lens. The at least first-side waveguide is positioned in a first-side of the lens for incidence of a wavelength-multiplexed optical signal into the lens. A plurality of second-side waveguide is so aligned in a second-side of the lens that terminals of the plurality of second-side waveguide are positioned at respective focusing points of respectively different-wavelength components included in the wavelength-multiplexed optical signal. The optical wavelength demultiplexer may have a high wavelength selectivity.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
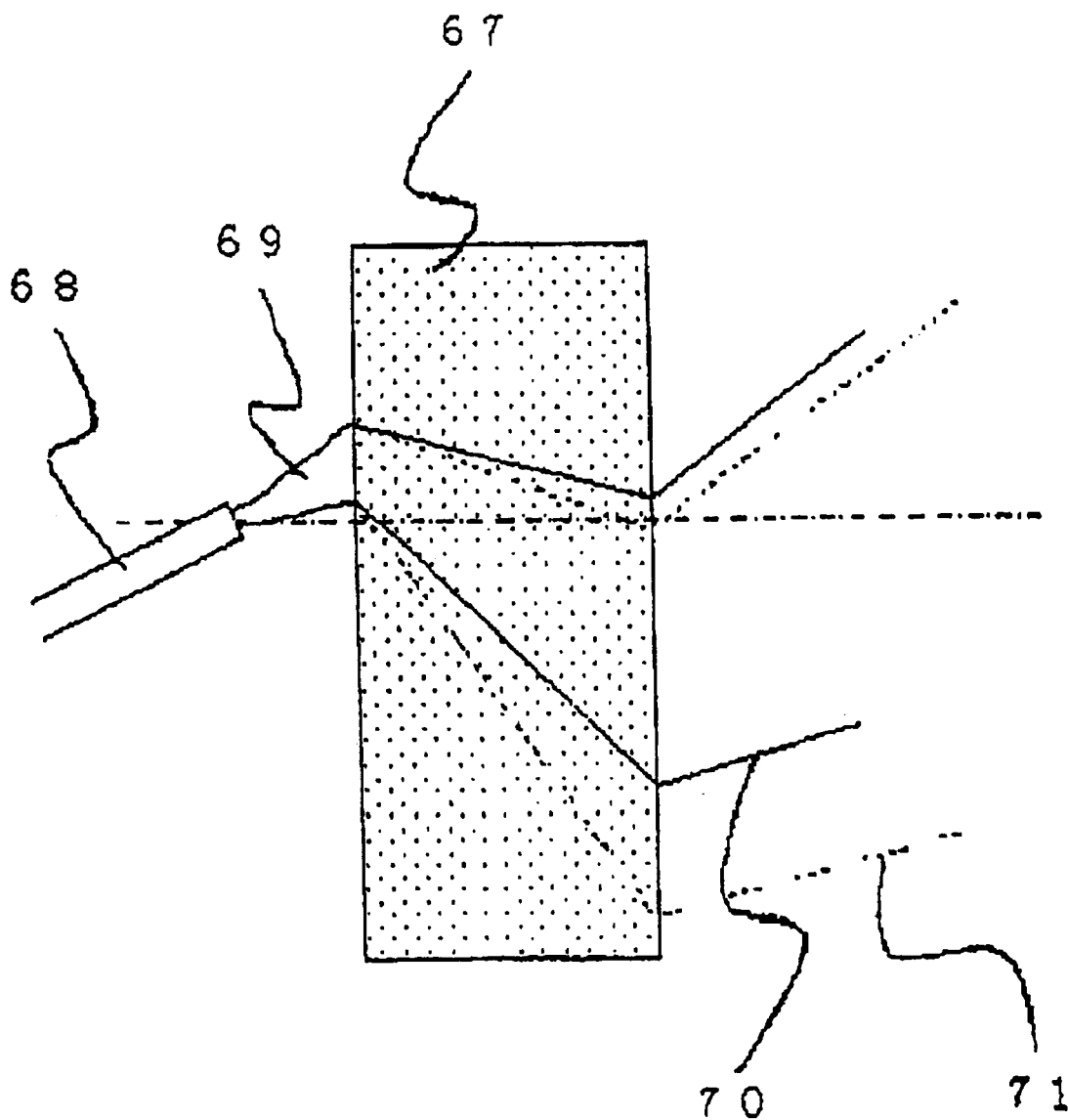
FIG. 1 is a schematic diagram illustrative of an optical mechanism of the conventional wavelength-demultiplexer.

A first aspect of the present invention is an optical lens having: a wave number distribution-surface having a section where an angular frequency is constant, and the section having a shape which generally represents at least a part of an ellipse or a circle; a medium allowing group-velocity directions toward an inside of the section to allow said medium to exhibit a lens effect; and at least a first focusing point at an inside position of the lens.

It is preferable that the lens has a finite thickness which is defined by a distance between two parallel planarized surfaces of the medium, and the lens also has at least a second focusing point at an outside position of the lens. The lens may typically comprise a photonic crystal having a periodic variation in dielectric constant. This photonic crystal operates in an operative range including a specific angular frequency which is specified at a crossing point between a first wave number distribution curve of the photonic crystal and a second wave number distribution curve of a peripheral medium, in which the photonic crystal and an objective entity exist. Preferably, the operative range may be defined between ±15% from the specific angular frequency of the photonic crystal to realize a reduced-fuzziness of a real image.

It is also preferable that the lens is so adopted that a ratio of a short axis to a long axis of the section to vary depending upon wavelength frequency to allow the lens to have a large chromatic aberration. Namely, the lens has a large dependency of focusing point upon the wavelength.

The photonic crystal may typically have any one of a triangular lattice structure, a primitive cubic lattice structure, a face-centered cubic lattice structure, a body-centered cubic lattice structure and modified-structures thereof. The modified-structure may include a slab-structure. The modified-structures may have either a unidirectional compression in lattice structure or a unidirectional extension in lattice structure.

A second aspect of the present invention is an optical wavelength demultiplexer including at least an optical lens, at least a first-side waveguide and a plurality of second-side waveguide. The at least optical lens has a wave number distribution-surface having a section where an angular frequency is constant, and the section having a shape which generally represents at least a part of an ellipse or a circle; a medium allowing group-velocity directions toward an inside of the section to allow said medium to exhibit a lens effect; a finite thickness defined by a distance between two parallel planarized surfaces of the medium; a first focusing point at an inside position of the lens; and a second focusing point at an outside position of the lens. The at least first-side waveguide is positioned in a first-side of the lens for incidence of a wavelength-multiplexed optical signal into the lens. A plurality of second-side waveguide is so aligned in a second-side of the lens that terminals of the plurality of second-side waveguide are positioned at respective focusing points of respectively different-wavelength components included in the wavelength-multiplexed optical signal. The optical wavelength demultiplexer may have a high wavelength selectivity.

The optical wavelength demultiplexer may advantageously and further include at least a prism interposed between the lens and the plurality of second-side waveguide for further improving the wavelength selectivity.

Each of the at least first-side waveguide and the plurality of second-side waveguide may include a non-terminal region, a first terminal region optically coupled to the lens and a second terminal region opposite to the first terminal region and optically coupled to an external optical system. The first terminal region may advantageously be larger in sectioned size, for example, width than the non-terminal region for reducing a coupling loss of the optical wavelength demultiplexer. Further advantageously, a length of the first terminal region may be smaller than a width of the non-terminal region for further reduction in the coupling loss.

The first terminal region may optionally and advantageously have a facet tilting from a plane vertical to a longitudinal direction of the non-terminal region for allowing a tilting optical coupling between the optical lens and the waveguides with desired reduction in coupling loss.

The first terminal region may optionally and advantageously have a facet included in a plane vertical to a longitudinal direction of the non-terminal region for allowing a non-tilting optical coupling between the optical lens and the waveguides with desired reduction in coupling loss.

The plurality of second-side waveguide may optionally and advantageously have a single-continuous structure including the respective first terminal regions of the plurality of second-side waveguide, so as to allow the above-described structure that the first terminal region may be larger in sectioned size, for example, width than the non-terminal region for reducing a coupling loss of the optical wavelength demultiplexer, even if the alignment of the waveguides is highly dense.

The second terminal region may be larger in sectioned size, for example, width than the non-terminal region for reducing a coupling loss of the optical wavelength demultiplexer. Further advantageously, a length of the second terminal region is smaller than a width of the non-terminal region.

The second terminal region may optionally and advantageously have a facet tilting from a plane vertical to a longitudinal direction of the non-terminal region for allowing a tilting optical coupling between the waveguides and the external optical system with desired reduction in coupling loss.

The second terminal region may optionally and advantageously have a facet included in a plane vertical to a longitudinal direction of the non-terminal region for allowing a non-tilting optical coupling between the waveguides and the external optical system with desired reduction in coupling loss.

The plurality of second-side waveguide may optionally and advantageously have a single-continuous structure including the respective second terminal regions of the plurality of second-side waveguide, so as to allow the above-described structure that the second terminal region may be larger in sectioned size, for example, width than the non-terminal region for reducing a coupling loss of the optical wavelength demultiplexer, even if the alignment of the waveguides is highly dense.

A third aspect of the present invention is an optical wavelength demultiplexer/multiplexer including: at least an optical lens, at least a first-side waveguide, and a plurality of second-side waveguide. The at least optical lens has: a wave number distribution-surface having a section where an angular frequency is constant, and the section having a shape which generally represents at least a part of an ellipse or a circle; a medium allowing group-velocity directions toward an inside of the section to allow said medium to exhibit a lens effect; a finite thickness defined by a distance between two parallel planarized surfaces of the medium; a first focusing point at an inside position of the lens; and a second focusing point at an outside position of the lens. The at least first-side waveguide is positioned in a first-side of the lens for incidence of a wavelength-multiplexed optical signal into the lens. The plurality of second-side waveguide is so aligned in a second-side of the lens that terminals of the plurality of second-side waveguide are positioned at respective focusing points of respectively different-wavelength components included in the wavelength-multiplexed optical signal.

A fourth aspect of the present invention is a variable-wavelength selecting optical filter including: at least an optical lens, at least a first-side waveguide, a plurality of second-side waveguide and a mechanism for actively varying the respective focusing points for wavelength selection. The at least optical lens has: a wave number distribution-surface having a section where an angular frequency is constant, and the section having a shape which generally represents at least a part of an ellipse or a circle; a medium allowing group-velocity directions toward an inside of the section to allow said medium to exhibit a lens effect; a finite thickness defined by a distance between two parallel planarized surfaces of the medium; a first focusing point at an inside position of the lens; and a second focusing point at an outside position of the lens. The at least first-side waveguide is positioned in a first-side of the lens for incidence of a wavelength-multiplexed optical signal into the lens. The plurality of second-side waveguide is so aligned in a second-side of the lens that terminals of the plurality of second-side waveguide are positioned at respective focusing points of respectively different-wavelength components included in the wavelength-multiplexed optical signal.

Figure 2:
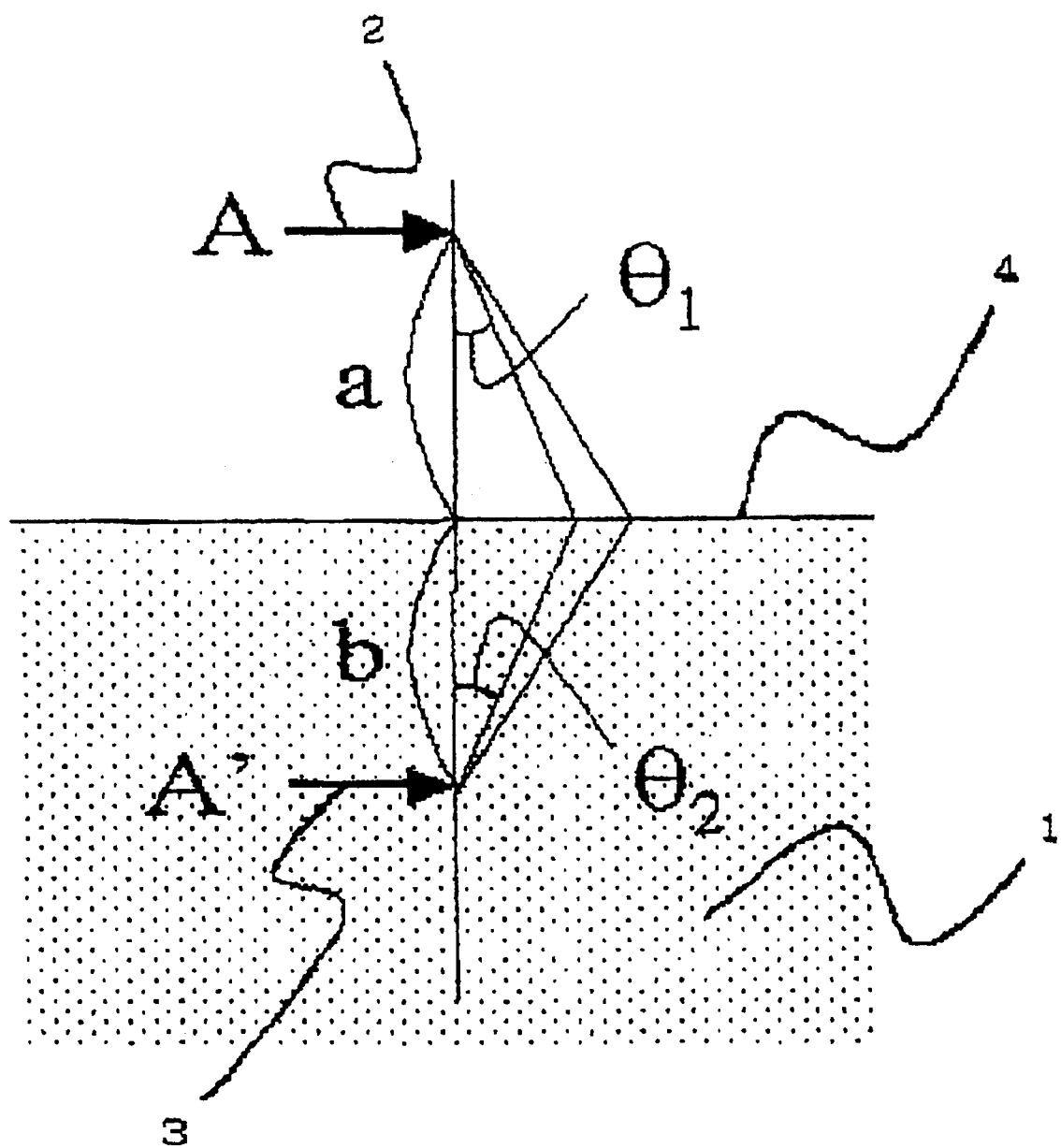
FIG. 2 is a diagram illustrative of a lens effect of the lens used in the present invention.

The above-described optical lens in accordance with the present invention has a large chromatic aberration or has a large dependency of the focusing point upon the wavelength. FIG. 2 is a diagram illustrative of a lens effect of the lens used in the present invention. The lens comprises a medium 1 which has a planarized surface 4. An entity 2 is placed in a peripheral medium which is positioned the outside of the lens medium 1 and at a position "A" with a distance "a" from the planarized surface 4 of the lens medium 1. A real image 3 is formed in the lens medium 1 and at a position "A'" with a distance "b" from the planarized surface 4 of the lens medium 1. The real image 3 is identical in size and direction with the entity 2. A light is emitted from the entity 2. The light has a wave number vector of "k" in the medium, in which the entity 2 exists. The light is emitted from the entity 2 at the position "A" and propagated in the peripheral medium with a beam-spread. The light is then incident into the lens medium 1 at an incident angle "θ1" and refracted at a refracting angle "−θ2" on the planarized surface 4 of the medium 1. The light is then propagated in the lens medium 1 and focused onto the position "A'" in the lens medium 1 to form the real image 3. An angular frequency "ω" is constant on a section of a wave number dispersion-surface of the lens medium 1. The section of a wave number dispersion-surface of the lens medium 1 has a shape which is represented by the following equation (1):

$$(k_x^2/k^2)+[(k_y-q)^2/(k/p)^2]=1 \quad (1)$$

where q is the arbitrary constant value, p=b/a is the ratio of the long axis to the short axis, k is the wave number vector and is represented by a function of angular frequency, or wavelength, and p is also represented by a function of angular frequency.

Figure 3:
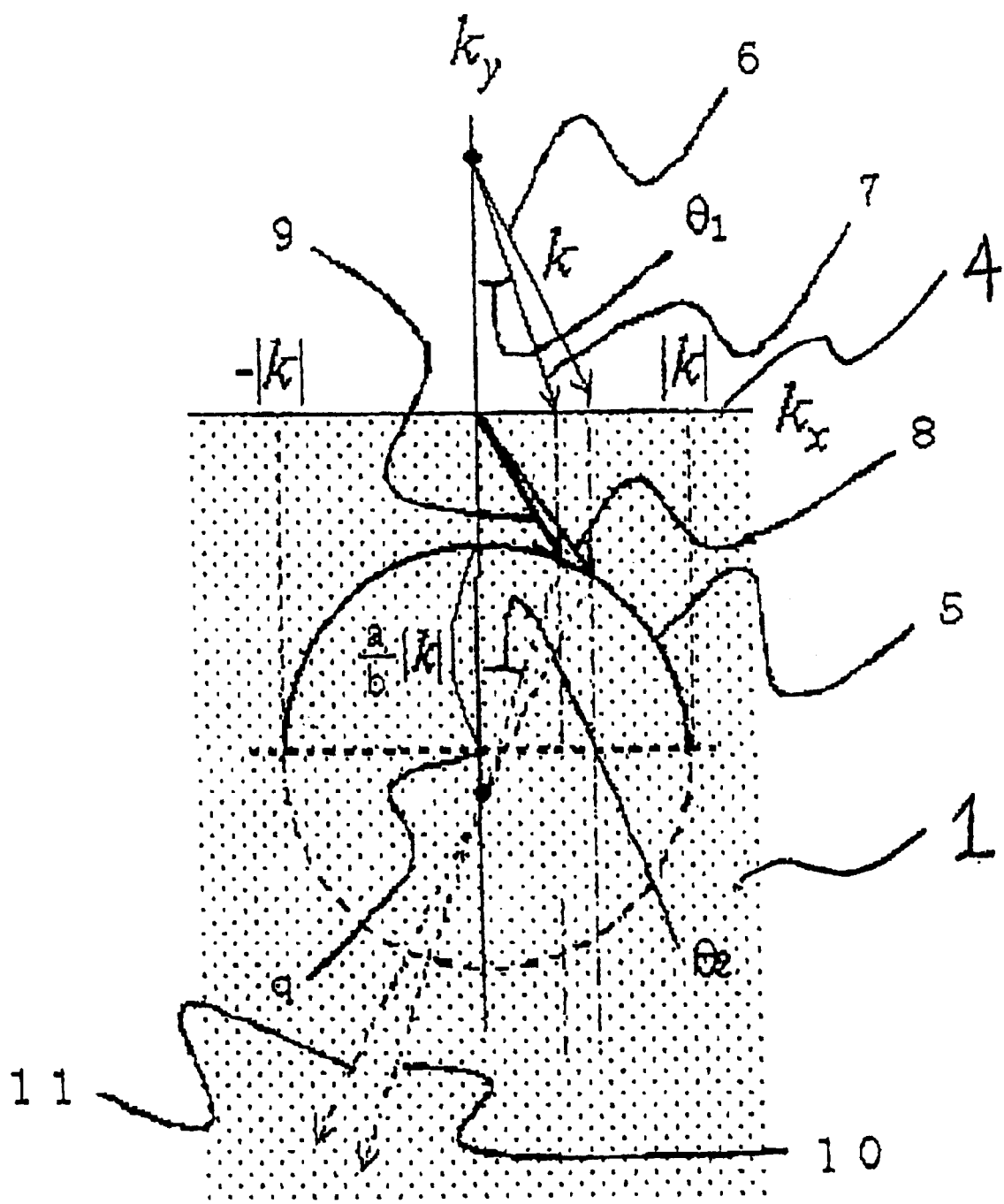
FIG. 3 is a diagram illustrative of a wave number dispersion-surface represented by the equation (1).

FIG. 3 is a diagram illustrative of a wave number dispersion-surface represented by the equation (1). The wave number dispersion-surface represented by the equation (1) has a section 5 where an angular frequency is constant. As shown in FIG. 3, the section has a shape which generally represents a part of an ellipse. In this typical example, the ellipse is so defined that the long axis is longer than the short axis. It is possible that the long axis is identical in length than the short axis, where the shape is circle. A first axis of the ellipse is parallel to the palatalized surface 4 of the lens medium 1. This first axis has a length which is equal to the double of the magnitude of the wave number vector of the incident light. If the section of the wave number dispersion-surface is circle, then the radius of the circle is equal to the magnitude of the wave number vector. In the lens medium 1, the propagation direction of the light is defined to be vertical to a tangential line or a tangential plane of the wave number dispersion-surface. For example, if a light has a wave number vector 8 which has an end point on the section 5 of the wave number dispersion-surface, then this light propagates in a direction represented by a broken line arrow mark 11 which is vertical to a tangential line from the above end point on the section 5 of the wave number dispersion-surface. Namely, the propagation direction of the group velocity is given by the arrow mark 11. There are inward and outward directions opposite or anti-parallel to each other, both of which are defined to be vertical to the tangential plane of the wave number dispersion-surface. The inward direction is a direction toward the inside of the section 5 of the wave number dispersion-surface. The outward direction is a direction toward the outside of the section 5 of the wave number dispersion-surface. The lens medium 1 exhibits the lens effect but only when the group velocity or the light propagation direction is directed inwardly or toward the inside of the section 5 of the wave number dispersion-surface.

Accordingly, if the section defined by the constant angular frequency of the wave number dispersion surface of the lens medium 1 is given by the ellipse or circle shape represented by the above equation (1), and the group velocity at a point on the section of the wave number dispersion surface is directed toward the inside of the section of the wave number dispersion surface, then the real image 3 of the entity 2 existing in the peripheral medium is formed in the lens medium 1, wherein the real image has the same size and the same direction as the entity 2.

The above discussion has been made, assuming that the lens medium 1 has an infinite thickness and has a single planarized surface bounded with the peripheral medium. The following discussion will be made, assuming that the lens medium 1 has a finite thickness and has two planarized surfaces bounded with the peripheral medium and parallel to each other to define the finite thickness.

Figure 4:
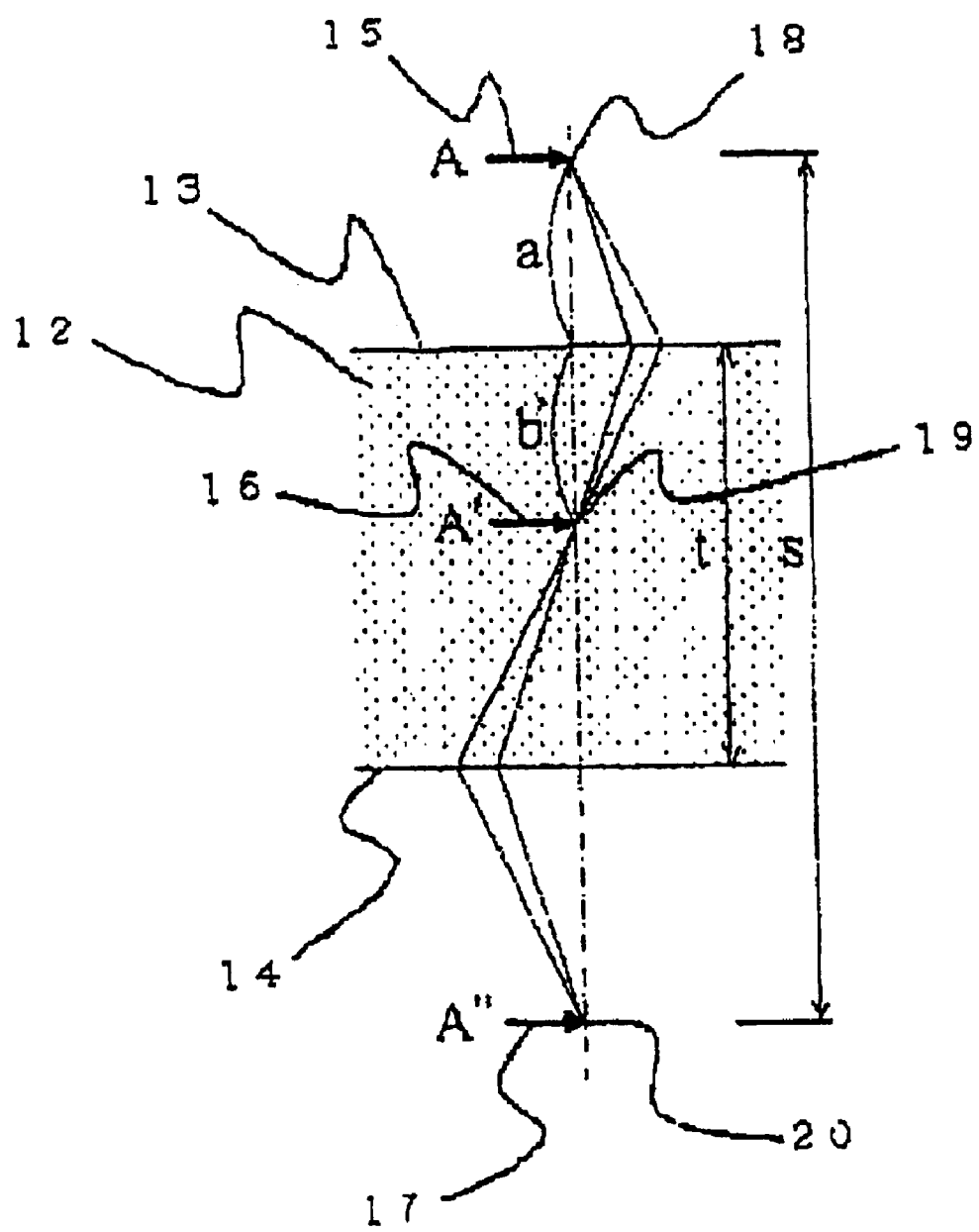
FIG. 4 is a diagram illustrative of a lens effect of an optical lens having a finite thickness in accordance with the present invention.

FIG. 4 is a diagram illustrative of a lens effect of an optical lens having a finite thickness in accordance with the present invention. An optical lens medium 12 has first and second planarized surfaces 13 and 14 which are parallel to each other and define a finite thickness "t". The first and second planarized surfaces 13 and 14 provide respective boundaries with the peripheral medium. The lens effect may appear on the first and second planarized surfaces 13 and 14 of the lens medium 12.

The entity 15 exists a position "A" in the peripheral medium. The position "A" is distanced by a distance "a" from the first planarized surface 13 of the lens medium 12. A light from the entity 15 is transmitted in the peripheral medium and then incident into the lens medium 12, wherein the lens effect appears on the first planarized surface 13 of the lens medium 12. The incident light is then propagated in the lens medium 12 to form a first real image 16 at a position "A'" in the lens medium 12. The position "A'" of the first real image 16 in the lens medium 12 is distanced by a distance "b" from the first planarized surface 13 of the lens medium 12. The first real image 16 has the same size and direction as the entity 15. The light is further propagated in the lens medium 12 and reaches on the second planarized surface 14 of the lens medium 12, which causes a second appearance of the lens effect. The light is further propagated in the peripheral medium to form a second real image 17 at a position "A''" in the peripheral medium. The position "A''" of the second real image 17 in the peripheral medium is distanced from the second planarized surface 14 of the lens medium 12. The second real image 17 also has the same size and direction as the entity 15. Namely, the lens medium 12 having the first and second planarized surfaces 13 and 14 provide a first focusing point 19 in the lend medium 12 for forming the first real image 16, and a second focusing point 20 in the peripheral medium for forming the second real image 17. It should be noted for forming the first real image 16 in the lend medium 12 that the finite thickness "t" be larger than the distance "b" defined between the first planarized surface 13 and the first focusing point 19, where the first real image 16 is formed.

The wavelength-demultiplexer may be realized by utilizing the above phenomenon that the second real image 17 is formed at the second focusing point 20 in the peripheral medium. A first-side waveguide is placed in the peripheral medium bounded with the first planarized surface 13 of the lens medium 12, wherein an output-side facet of the first-side waveguide is positioned at the above position "A" or a light emitting point 18, so that a light emitted from the output-side facet of the first-side waveguide is propagated in the peripheral medium toward the first planarized surface 13 of the lens medium 12. The light is then incident via the first planarized surface 13 into the lens medium 12, wherein the lens effect appears on the first planarized surface 13 of the lens medium 12. The incident light is then propagated in the lens medium 12 to form the first real image 16 at the first focusing point 19 with the position "A'" in the lens medium 12. The light is further propagated in the lens medium 12 and reaches on the second planarized surface 14 of the lens medium 12, which causes the second appearance of the lens effect. The light is further propagated in the peripheral medium to form the second real image 17 at the second focusing point 20 with the position "A''" in the peripheral medium. The light focused at the second focusing point 20 has substantially the same beam waist diameter as when the light was emitted from the output-side facet of the first-side waveguide at the emitting position 18. A second-side waveguide is placed in the peripheral medium bounded with the second planarized surface 14 of the lens medium 12, wherein an input-side facet of the second-side waveguide is positioned at the second focusing point 20 with the position "A''", where the second real image 17 is formed. If the second-side waveguide has substantially the same diameter or sectioned size, then this allows the second-side waveguide to receive the light without any substantive loss.

It should, however, be noted that it is essential for realization of the wavelength demultiplexer that a difference in wavelength of the light causes a difference in position "A''" of the second focusing point 20. It is assumed that the lens medium 12 has the thickness "t" defined between the first and second planarized surfaces 13 and 14, and also that there is a distance "s" between the position "A" of the light emitting point 18 or the entity 15 and the position "A''" of the second focusing point 20 of the second real image 17. The following equations are established.

$$s = [1 + (1/p)]t \quad (2)$$

$$ds/dp = -(t/p^2) \quad (3)$$

The above equations (2) and (3) show that the distance "s" or the position "A''" of the second focusing point 20 of the second real image 17 varies depending upon the value "p". The distance "s" is increased as the value "p" is decreased. The distance "s" is decreased as the value "p" is increased. The distance "s" is large as the thickness "t" is large. The distance "s" is small as the thickness "t" is small. Namely, the distance "s" is large as the thickness "t" is large and the value "p" is small. The distance "s" is small as the thickness "t" is small and the value "p" is large.

As described above in connection with the above equation (1), the value "p" is the ratio of the long axis to the short axis of the ellipse of the section, where the angular frequency is constant, of the wave number dispersion surface. TIe ratio "p" varies depending upon the wavelength of the light. Thus, a difference in wavelength or color of the light causes a difference in position "A''" of the second focusing point 20. The lens medium 12 provides a chromatic aberration. Since a slight variation in the wavelength of the light causes a relatively large variation in the value "p", then the slight variation in the wavelength of the light causes a relatively large variation in the position "A''" of the second focusing point 20. Namely, the lens medium 12 provides a relatively large chromatic aberration. Namely, a plurality of second-side waveguide is aligned at respective positions "A''" of the respective second focusing points of the respective light wavelengths, to realize the wavelength demultiplexer. If the wavelength-multiplexed optical signal from the first-side waveguide is incident into the lens medium 12, then the respective wavelength components of the wavelength-multiplexed optical signal are received by the respective second-side waveguides at the respective different positions of the second focusing points. Since each of the respective wavelength components includes only a single wavelength, each of the respective wavelength components shows substantially no spread. Namely, each of the respective wavelength components is received by corresponding one of the respective second-side waveguides without any substantive drop in the wavelength resolution.

Figure 5:
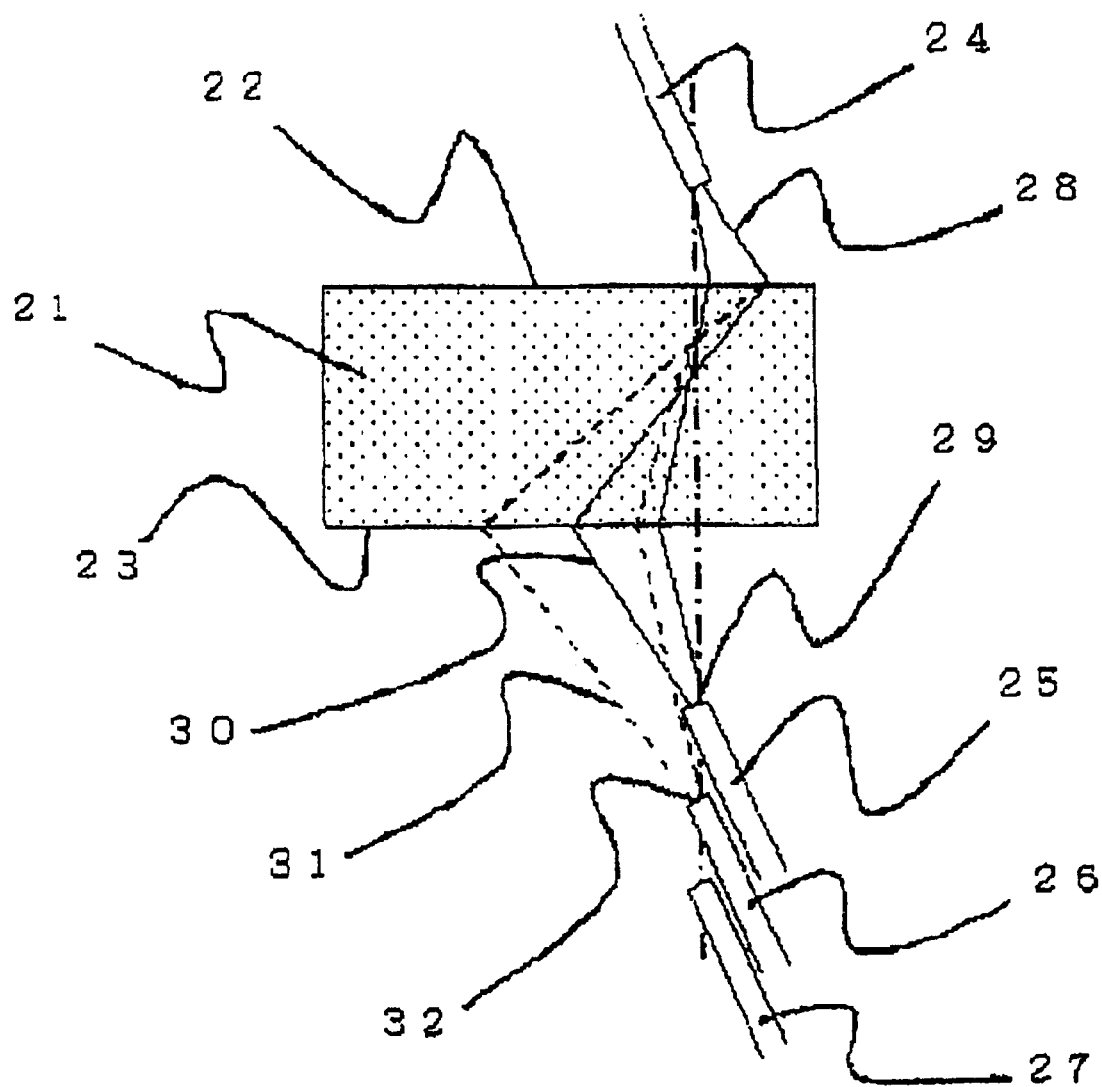
FIG. 5 is a schematic diagram illustrative of a typical example of the structure of the wavelength demultiplexer in accordance with the present invention.

FIG. 5 is a schematic diagram illustrative of a typical example of the structure of the wavelength demultiplexer in accordance with the present invention. The wavelength demultiplexer includes an optical lens 21, a single first-side waveguide 24 and a set of three second-side waveguides 25, 26 and 27. The optical lens medium 21 has first and second planarized surfaces 22 and 23 which are bounded with first-side and second-side peripheral mediums. The first-side waveguide 24 is placed in the first-side peripheral medium bounded with the first planarized surface 22 of the lens medium 21. The three second-side waveguides 25, 26 and 27 are placed in the second-side peripheral medium bounded with the second planarized surface 23 of the lens medium 21. The three second-side waveguides 25, 26 and 27 are placed so that input-side facets of the three second-side waveguides 25, 26 and 27 are aligned at respective positions of the second focusing points of the respective wavelength components included in the wavelength-multiplexed optical signal 28 from the first-side waveguide 24.

The first-side waveguide 24 is directed to tilt from a normal of the first planarized surface 22 of the lens medium 21 for an oblique incidence, into the first planarized surface 22, of the wavelength-multiplexed optical signal 28 from the first-side waveguide 24. The wavelength-multiplexed optical signal 28 is refracted due to the lens effect on the first planarized surface 22, wherein respective wavelength components 30 and 31 included in the wavelength-multiplexed optical signal 28 show different refractions at different angles. The respective wavelength components 30 and 31 are propagated in the lens medium 21 in different propagation axes and focused at different first focusing points respectively in the lens medium 21. The respective wavelength components 30 and 31 are further propagated in the lens medium 21 and refracted on the second planarized surface 23 of the lens medium 21 at different refraction angles. The respective wavelength components 30 and 31 are further propagated through the second-side peripheral medium in oblique directions from the normal of the second planarized surface 23 of the lens medium 21 and then focused at different second focusing points 29 and 32, where input-side facets of the second-side waveguides 25 and 26 are positioned, so that the respective wavelength components 30 and 31 as focused are respectively received by the second-side waveguides 25 and 26 which are directed tilting from the normal of the second planarized surface 23 of the lens medium 21.

The wavelength resolution depends on a ratio of the second focusing point difference from the wavelength difference. Provision of a prism between the second planarized surface of the lens medium and the alignment of the second-side waveguides allows a further increase in the second focusing point difference among the difference wavelength components.

Figure 6:
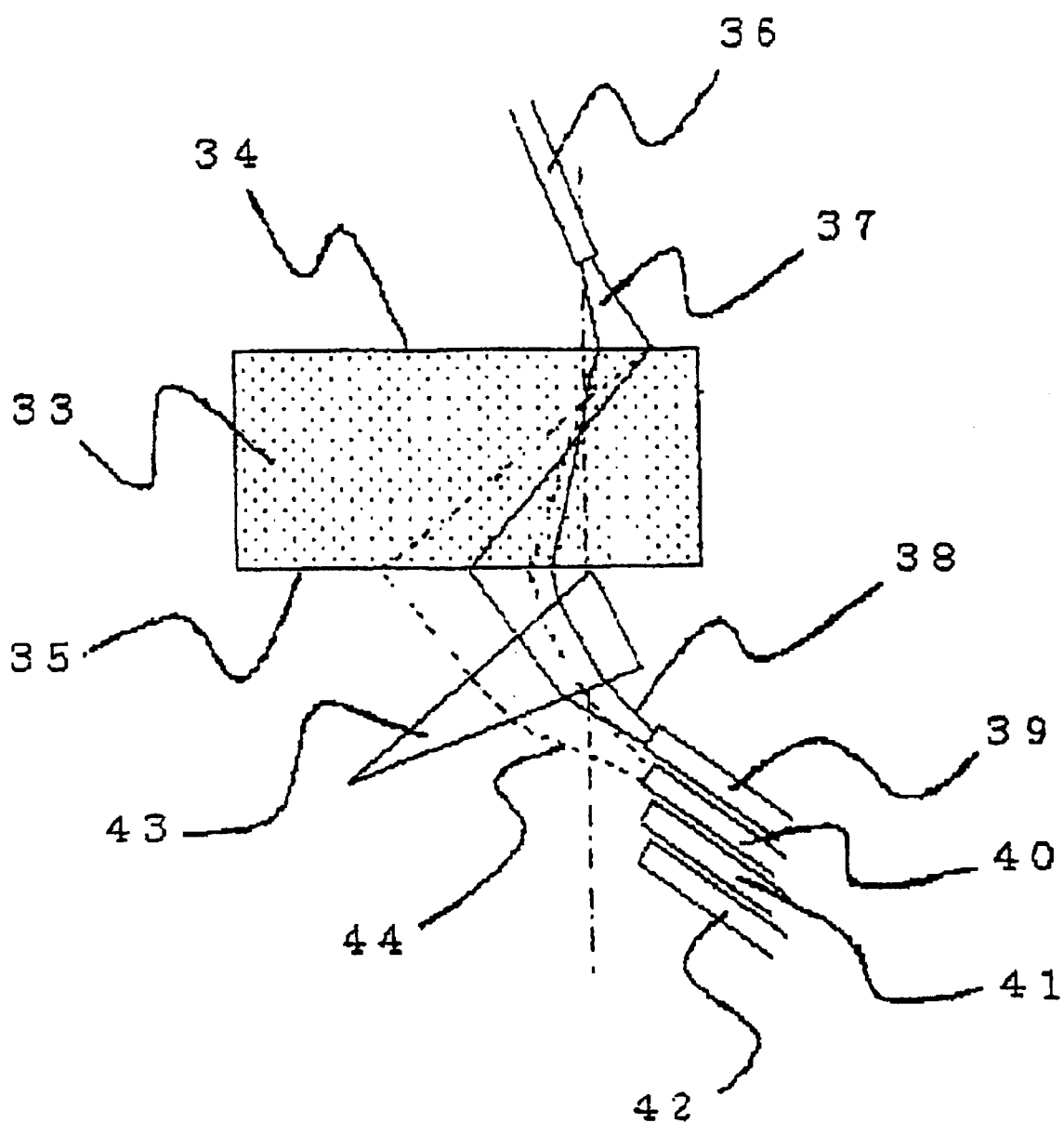
FIG. 6 is a schematic diagram illustrative of another typical example of the structure of the wavelength demultiplexer in accordance with the present invention.

FIG. 6 is a schematic diagram illustrative of another typical example of the structure of the wavelength demultiplexer in accordance with the present invention. The wavelength demultiplexer includes an optical lens 33, a single first-side waveguide 36, a single prism 43 and a set of four second-side waveguides 39, 40, 41 and 42. The optical lens medium 33 has first and second planarized surfaces 34 and 35 which are bounded with first-side and second-side peripheral mediums. The first-side waveguide 36 is placed in the first-side peripheral medium bounded with the first planarized surface 34 of the lens medium 33. The four second-side waveguides 39, 40, 41 and 42 are placed in the second-side peripheral medium bounded with the second planarized surface 35 of the lens medium 33. The four second-side waveguides 39, 40, 41 and 42 are placed so that input-side facets of the four second-side waveguides 39, 40, 41 and 42 are aligned at respective positions of the second focusing points of the respective wavelength components included in the wavelength-multiplexed optical signal 37 from the first-side waveguide 36. The prism 43 is interposed between the second planarized surface 35 of the lens medium 33 and the alignment of the four second-side waveguides 39, 40, 41 and 42.

The first-side waveguide 36 is directed to tilt from a normal of the first planarized surface 34 of the lens medium 33 for an oblique incidence, into the first planarized surface 34, of the wavelength-multiplexed optical signal 37 from the first-side waveguide 36. The wavelength-multiplexed optical signal 37 is refracted due to the lens effect on the first planarized surface 34, wherein respective wavelength components 38 and 44 included in the wavelength-multiplexed optical signal 37 show different refractions at different angles. The respective wavelength components 38 and 44 are propagated in the lens medium 33 in different propagation axes and focused at different first focusing points respectively in the lens medium 33. The respective wavelength components 38 and 44 are further propagated in the lens medium 33 and refracted on the second planarized surface 35 of the lens medium 33 at different refraction angles. The respective wavelength components 38 and 44 are further propagated through the second-side peripheral medium in oblique directions from the normal of the second planarized surface 35 of the lens medium 33 and then incident into the prism 43, wherein the respective wavelength components 38 and 44 show further refractions at different angles. The respective wavelength components 38 and 44 are then propagated in the prism 43 and then incident into the peripheral medium again, wherein the respective wavelength components 38 and 44 show furthermore refractions at different angles. The respective wavelength components 38 and 44 are thus focused at different second focusing points 29 and 32, where input-side facets of the second-side waveguides 25 and 26 are positioned, so that the respective wavelength components 30 and 31 as focused are respectively received by the second-side waveguides 25 and 26 which are directed tilting from the normal of the second planarized surface 23 of the lens medium 21. The provision of the prism 43 between the second planarized surface 34 of the lens medium 33 and the alignment of the four second-side waveguides 39, 40, 41 and 42 allows a further increase in the second focusing point difference among the difference wavelength components. Namely, the provision of the prism 43 increases the distance or alignment pitch of the four second-side waveguides 39, 40, 41 and 42 as compared to when no prism is provided. The provision of the prism 43 allows narrowing the wavelength pitch of the respective different wavelength components if the distance or the alignment pitch of the four second-side waveguides 39, 40, 41 and 42 is fixed. This improves the wavelength resolution.

In this typical example, the prism 43 is distanced from the second planarized surface 35 of the lens medium 33. Notwithstanding, it is possible as a modification that the prism 43 is in contact with the second planarized surface 35 of the lens medium 33.

Figure 7:
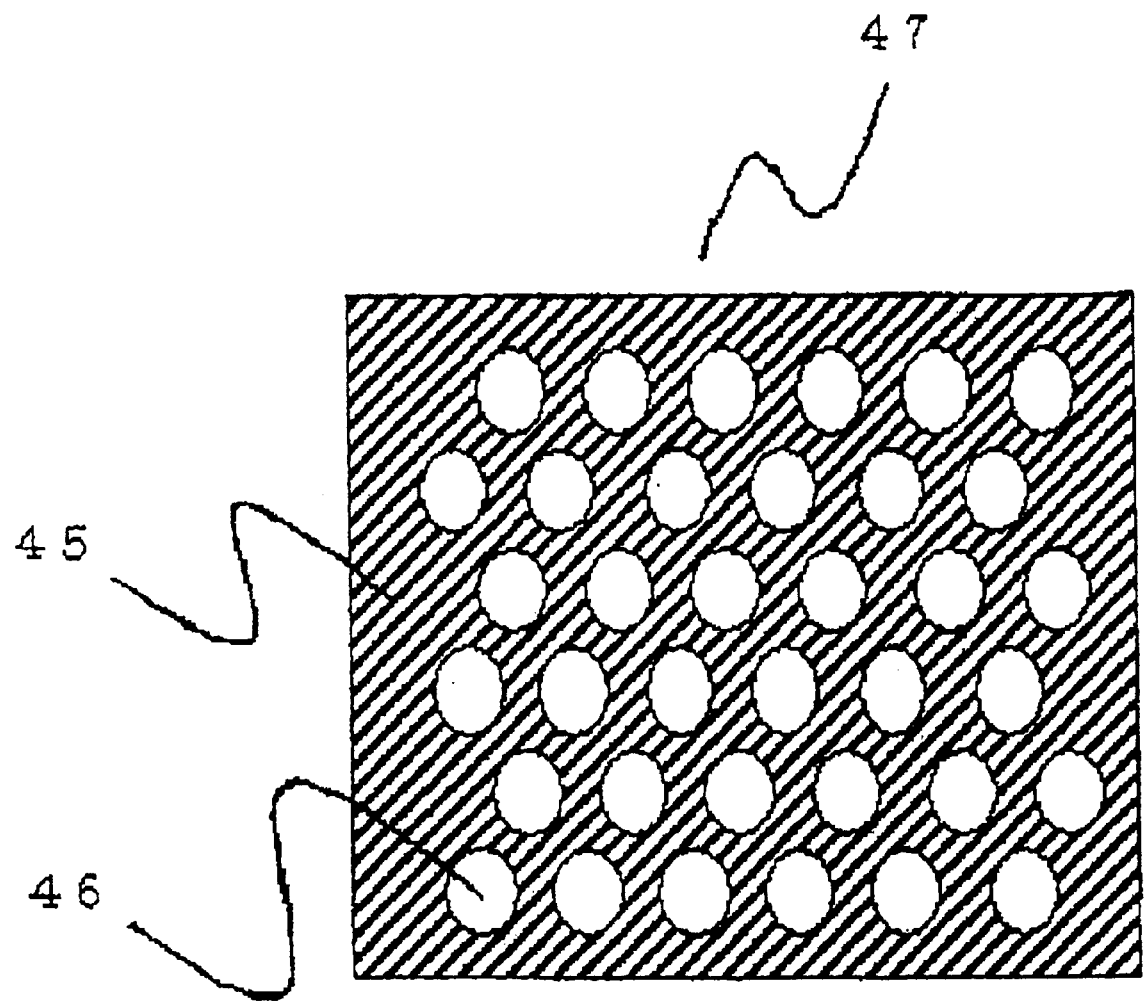
FIG. 7 is a sectional view of a typical example of a triangular lattice structure of a photonic crystal serving as a lens medium used in the wavelength demultiplexer in accordance with the present invention.

The ellipse or circle section shape of the wave number dispersion surface, represented by the above equation (1) may be realized by using a photonic crystal, for example. FIG. 7 is a sectional view of a typical example of a triangular lattice structure of a photonic crystal serving as a lens medium used in the wavelength demultiplexer in accordance with the present invention. A photonic crystal 47 comprises a silicon crystal 45 and a triangular lattice array at a pitch "a" of circle shaped holes 46 with a diameter D=0.9a. The triangular lattice array is typical one of the spatially-periodic arrangements of the holes 46.

Figure 8:
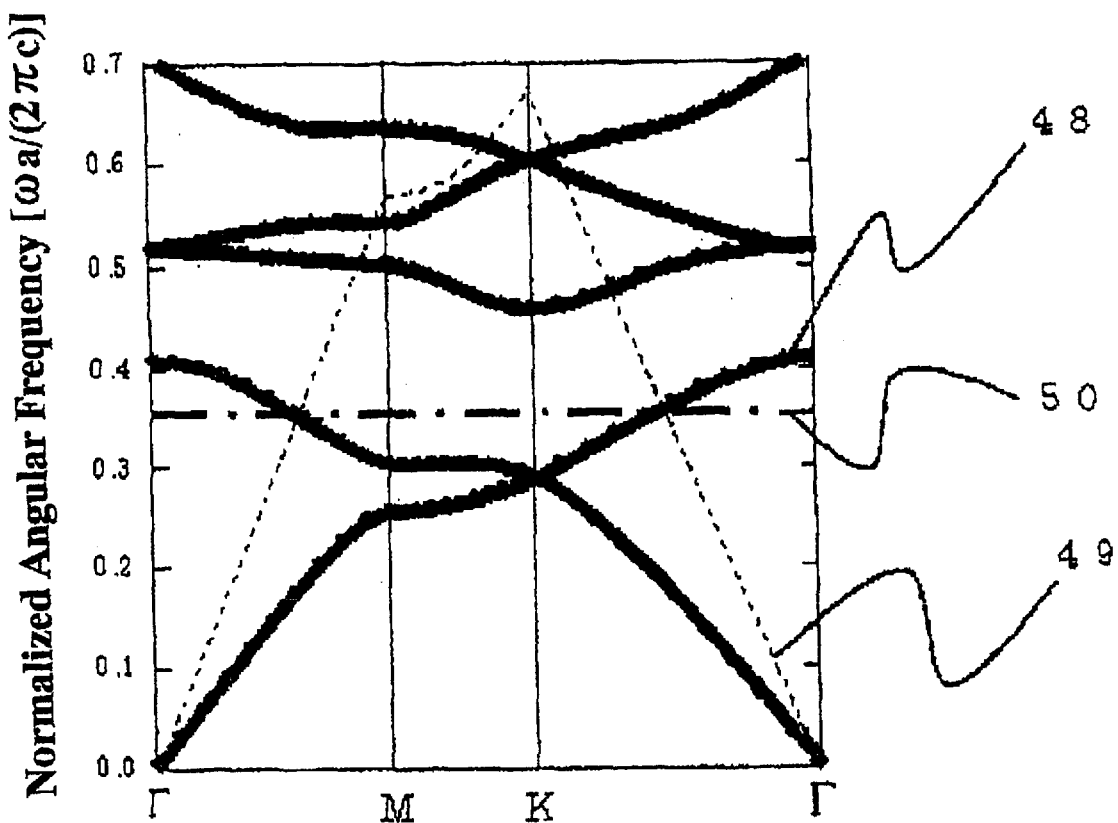
FIG. 8 is a diagram illustrative of typical examples of wave number dispersion curves in TE-mode in respective directions between typical points M, K and Γ.

FIG. 8 is a diagram illustrative of typical examples of wave number dispersion curves in TE-mode in respective directions between typical points M, K and Γ. A vertical axis represents the normalized angular frequency [$\omega a/(2\pi c)$]. "$\omega$" represents the angular frequency. "a" represents a lattice pitch of the triangular lattice photonic crystal 47. "c" is the velocity of light in vacuum. An inter-relationship between the angular frequency "$\omega$" and the wavelength "$\lambda$" is given by $\omega=2\pi c/\lambda$. Namely, the angular frequency "$\omega$" is inversely proportional to the wavelength "$\lambda$". The real lines represent wave number dispersion curves 48 of the photonic crystal 47. The wave number dispersion curve of the photonic crystal is also so called as a photonic band. The direction of the field in the TE-mode is vertical to a section of the photonic crystal 47, wherein the section is shown in FIG. 7. It is assumed for the following discussions that the real image and the optical lens are present in an air. In FIG. 8, a dotted line represents a wave number dispersion curve 49 of the light in air. If the real image and the lens are present in a different medium from air, then another wave number dispersion curve of the light in this different medium from air should be used. In FIG. 8, a broken line 50 horizontally running represents that the normalized angular frequency [$\omega a/(2\pi c)$] is 0.355. In the vicinity of the broken line 50, there are two crossing points of the wave number dispersion curves 48 of the light in the photonic crystal and the wave number dispersion curves 49 of the light in air. In an angular frequency band including the two crossing points and the broken line 50 of 0.355, the section shape of the wave number dispersion surface of the photonic crystal 47 is generally circle, which has a radius equal to a wave number in the air. The section shape of the wave number dispersion surface almost satisfies the above equation (1). In the meantime, the group velocity "v" of light is given by $v=d\omega/dk$. Assuming that the point "Γ" is the origin in FIG. 8, the wave number dispersion curve of the photonic crystal 47 has a negative gradient at the 0.355 normalized angular frequency represented by the broken line 50. Namely, the direction of the group velocity is toward the point "Γ". In the other wards, the direction of the group velocity is inward or toward the inside of the ellipse or circle shaped section of the wave number dispersion. Accordingly, all of the necessary requirements for causing the lens effect are satisfied.

Consequently, if the wave number dispersion curve of the photonic crystal has a negative gradient, provided that the point "Γ" is the origin, in the vicinity of a specific angular frequency, where the wave number dispersion curve of the photonic crystal and the wave number dispersion curve of the peripheral medium, in which the photonic crystal and the real image are present, then the photonic crystal exhibits the lens effect in the vicinity of the specific angular frequency.

A variation of the angular frequency from the specific value of 0.355 represented by the broken line 50 causes a difference between the radius of the ellipse of the section of the wave number dispersion surface of the photonic crystal 47 and the radius of the circle of the section of the wave number dispersion surface of the air as the peripheral medium in which the real image and the photonic crystal 47 are present. This difference causes a defocus or a blooming of the real image. The degree of defocus or blooming depends on the magnitude of the difference. If the difference is small, then the defocus or blooming is also small. If the variation in the angular frequency is limited within ±15% from the specific value of 0.355 represented by the broken line 50, then the defocus or blooming is small.

On the other hand, it is demonstrated that a difference in radius of the sections of the wave number dispersion surfaces causes substantially equivalent effect to when the variable "p" in the above equation (1) varies. The variation in the variable "p" means variation in position of the focusing point, for which reason a variation of the angular frequency or the wavelength causes a variation in the position of the focusing point. Namely, the photonic crystal 47 serves as an optical lens which has a large chromatic aberration and is suitable for the wavelength-demultiplexer.

Figure 9:
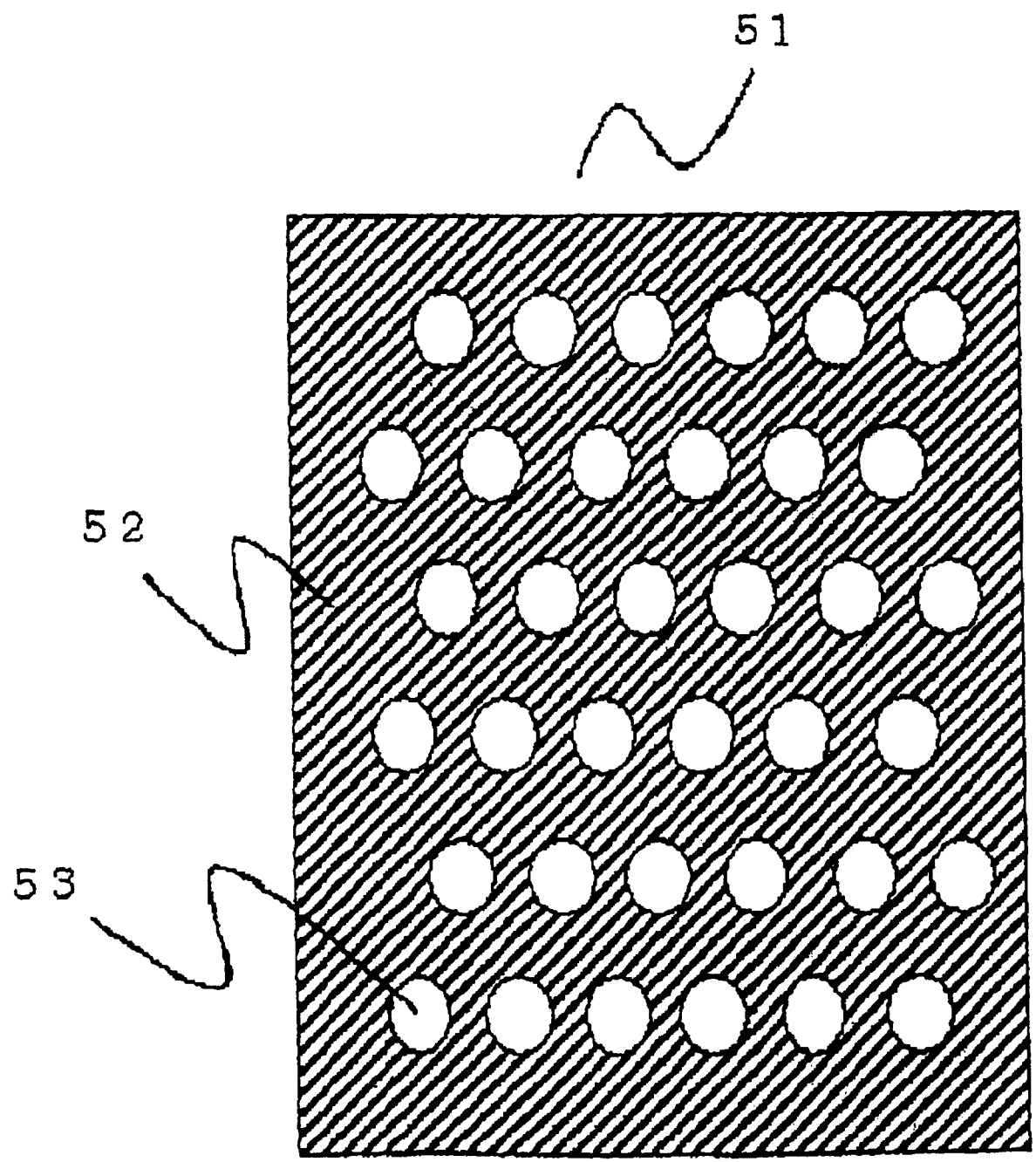
FIG. 9 is a sectional view of another typical example of a modified triangular lattice structure of a photonic crystal serving as a lens medium used in the wavelength demultiplexer in accordance with the present invention.

At the angular frequency where there are crossing points of the wave number dispersion curve of the photonic crystal 47 and the wave number dispersion curve of the peripheral medium, the section with the constant angular frequency of the wave number dispersion surface of the photonic crystal has a generally circle shape, where the variable "p" is nearly equal to 1. It should be noted that the variable "p" as the ratio of the long axis to the short axis of the ellipse of the section of the wave number dispersion surface is not limited to nearly 1, but may be required to take other values, for example, nearly 2 or nearly 0.5. In those cases, the section shape is deformed from the circle to an ellipse by an available method for a unidirectional extension or compression of the photonic crystal. FIG. 9 is a sectional view of another typical example of a modified triangular lattice structure of a photonic crystal serving as a lens medium used in the wavelength demultiplexer in accordance with the present invention. A photonic crystal 51 comprises a silicon crystal 51 and a deformed triangular lattice array of circle shaped holes 53, wherein this lattice structure is obtained by extension in a Γ–M direction by 1.5 times from the lattice structure of FIG. 7. This extension in the Γ–M direction by 1.5 times of the photonic crystal lattice structure causes an approximately 1.5 times compression in the Γ–M direction of the section with the constant angular frequency of the wave number dispersion surface of the photonic crystal 51, whereby the section shape becomes an ellipse with p is approximately equal to 1/1.5.

In the above typical example, the photonic crystal lattice structure is the triangular lattice structure. Further typical examples of the photonic crystal lattice structure may include, but not limited to, a primitive cubic lattice structure, a face-centered cubic lattice structure, a body-centered cubic lattice structure and modified-structures thereof. The photonic crystal may optionally be any two-dimensional lattice structure such as a slab shaped crystal or any three-dimensional lattice structure. The lattice structure may optionally have any type symmetry.

It should also be noted that the optical lens with a relatively large chromatic aberration in accordance with the present invention may include, but not limited to any photonic crystals. The optical lens may include any element which exhibits a lens effect.

Further, an intentional or active variation in the focusing point of the lens causes switch or change of incident one of the wavelength-different components into the fixed second-side waveguide as receiver. A further provision of any available mechanism for intentional or active variation in the focusing point of the lens to the wavelength demultiplexer may realizes a variable wavelength selecting filter.

If the lens having a relatively large chromatic aberration comprises the photonic crystal, there are available methods for intentional or active variation in the focusing point of the lens, for example, heating the photonic crystal, applying a mechanical compression such as a pressure to the photonic crystal to change the lattice constant of the photonic crystal, applying a mechanical extension to the photonic crystal to change the lattice constant of the photonic crystal, as well as methods for electrically, magnetically and optically changing the refractive index of the medium of the photonic crystal.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

Figure 10:
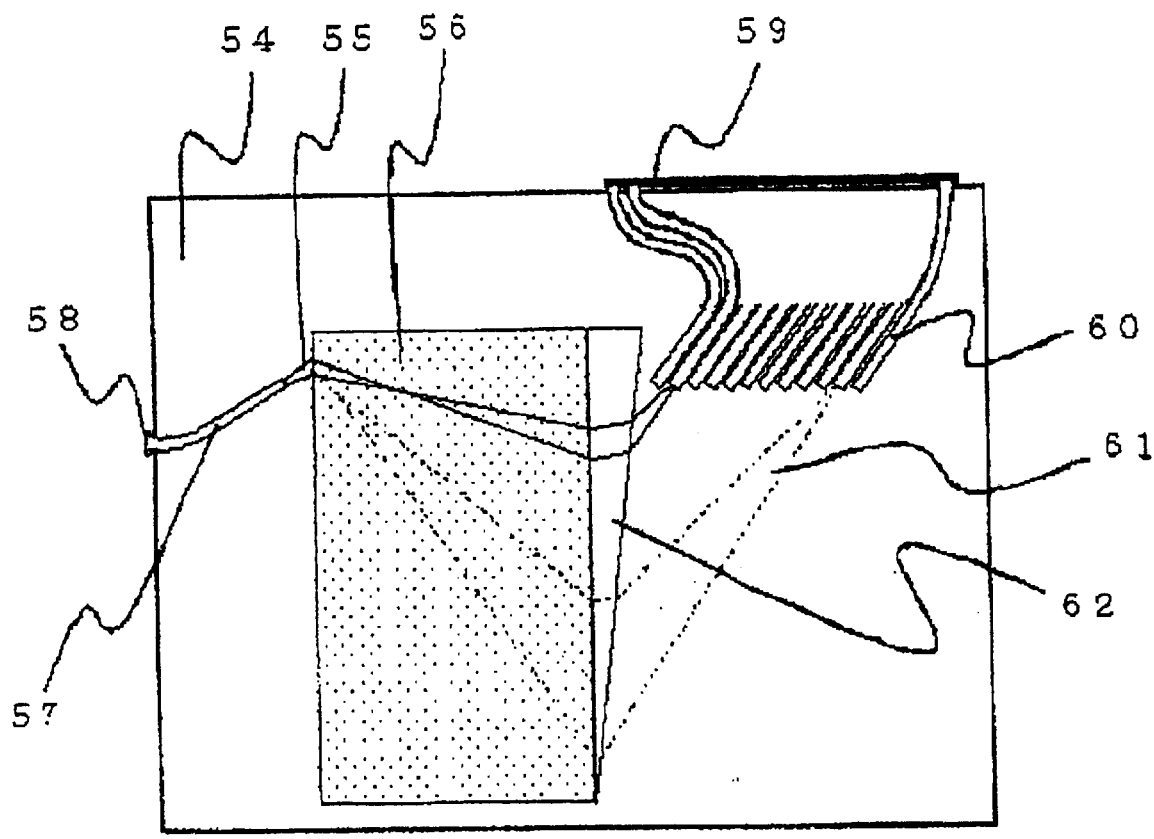
FIG. 10 is a schematic view of a wavelength demultiplexer formed over a silicon-on-insulator substrate in accordance with the present invention.

FIG. 10 is a schematic view of a wavelength demultiplexer formed over a silicon-on-insulator substrate in accordance with the present invention. A silicon-on-insulator substrate 54 comprises a silicon substrate, a silicon dioxide film over the silicon substrate and a silicon film over the silicon dioxide film. The silicon film as a top layer serves as a core layer. An air layer over the silicon film and the silicon dioxide layer serve as top and bottom cladding layers respectively, so that the silicon-on-insulator substrate 54 provides a slab-type waveguide. A photonic crystal 56 is selectively provided over the silicon-on-insulator substrate 54. The photonic crystal 56 comprises a silicon crystal with a triangular lattice array of holes with a lattice pitch of 0.7 micrometers and a hole diameter of 0.63 micrometers. The photonic crystal 56 has first and second planarized surfaces. A prism 62 made of silicon is also provided which is in contact with the second planarized surface of the photonic crystal 56. The photonic crystal 56 has a size of 500 micrometers×300 micrometers.

A first-side silicon channel waveguide 57 with a width of 0.6 micrometers is placed in the first-side and at a position distanced by 10 micrometers from the first planarized surface of the photonic crystal 56, wherein the first-side silicon channel waveguide 57 is directed to have a tilting angle of 30 degrees from a normal of the first planarized surface of the photonic crystal 56. An array of plural second-side silicon channel waveguides 60 is placed in the second-side, wherein input-side facets or terminals of the plural second-side silicon channel waveguides 60 are positioned at positions of respective second focusing points of the respective wavelength-different components. Each of the plural second-side silicon channel waveguides 60 has a uniform width of 0.6 micrometers. The silicon film as the top layer of the silicon-on-insulator substrate is selectively etched, except for other regions than the photonic crystal 56, the first-side silicon channel waveguide 57, the array of plural second-side silicon channel waveguides 60 and the prism 62. Notwithstanding, additional processes for a chemical vapor deposition of silicon nitride and subsequent planarization were made, so that the CVD-silicon nitride layer has the same thickness as the silicon film. Optionally, it is possible to further deposit a silicon dioxide layer over the silicon film and the silicon nitride film. Since silicon nitride has a refractive index larger than silicon oxide and air, a multi-layered structure of silicon dioxide, silicon nitride and air or silicon dioxide serves as a slab type waveguide, wherein the silicon nitride layer serves as a core layer, while the silicon dioxide layer and the air layer serve as top and bottom cladding layers. For those reasons, a light 55 emitted from the first-side silicon channel waveguide 57 and a light beam 62 as propagated through the photonic crystal 56 have no spread in the thickness direction of the silicon layer but are confined within the silicon nitride layer during the propagation to be introduced into the photonic crystal 56 and the plural second-side silicon channel waveguides 60. Instead of the silicon nitride core layer, an SiON film may also be available as the core layer of the waveguide, within which the light is confined, because SiON has a larger refractive index than silicon dioxide and air.

The wavelength demultiplexer of FIG. 10 ensures 50 channels under the conditions of a wavelength band of "λ"=1.5 micrometers, and a 50 GHz pitch. The wavelength demultiplexer has an approximate size of 0.7 mm×1 mm. If the photonic crystal 56 is sized up to 1 mm×0.6 mm, then the wavelength demultiplexer ensures 500 channels under the same conditions as described above. In this case, the wavelength demultiplexer has an approximate size of 2 mm×1.2 mm, which is only about 1/100 in area of the conventional wavelength demultiplexer.

Figure 11:
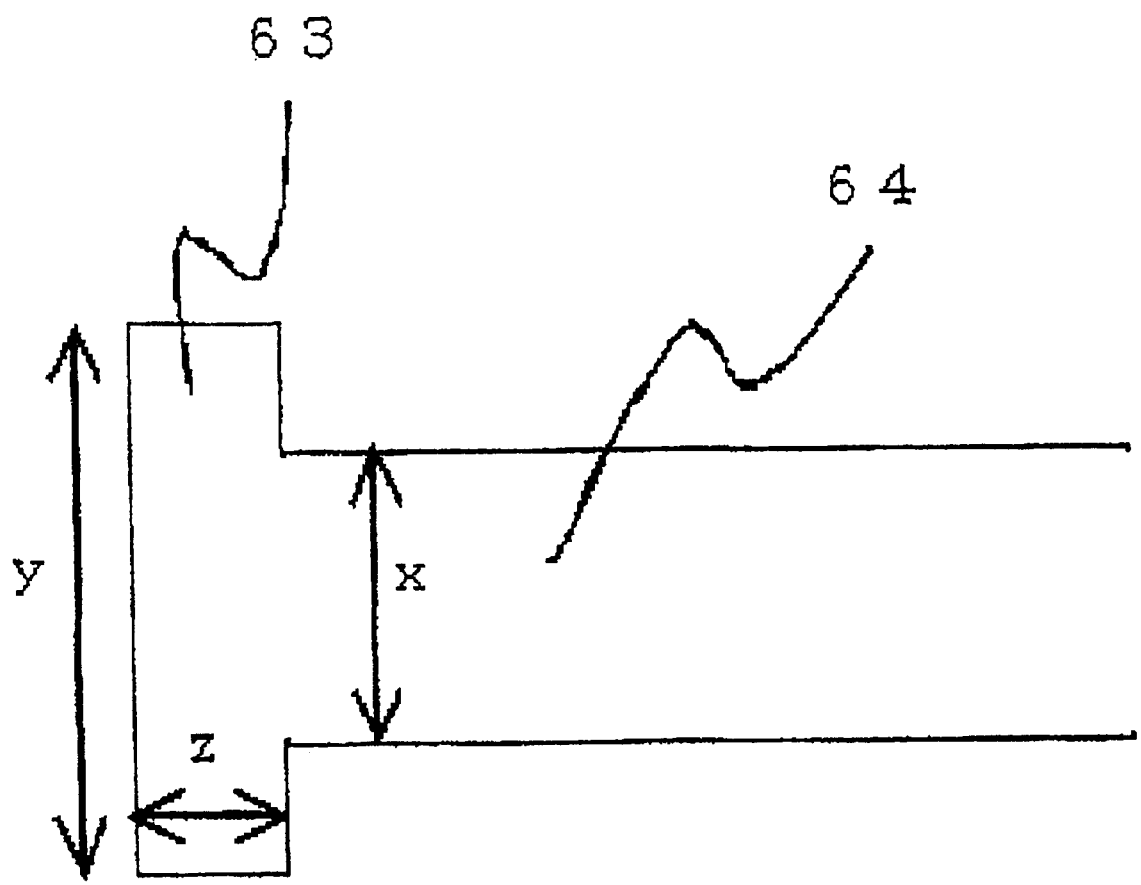
FIG. 11 is a fragmentary enlarged schematic view of a typical example of a width-increased incident-side terminal of the first-side silicon channel waveguide in FIG. 10.

In the wavelength demultiplexer of FIG. 10, the first-side silicon channel waveguide 57 has a width-increased incident-side terminal 58, from which a light is incident into the first-side silicon channel waveguide 57, so that the width-increased incident-side terminal 58 has a high optical coupling efficiency. FIG. 11 is a fragmentary enlarged schematic view of a typical example of a width-increased incident-side terminal of the first-side silicon channel waveguide in FIG. 10. A first-side silicon channel waveguide 64 has a with "x", while a width-increased incident-side terminal 63 has a width "y" which is distinctly larger than the with "x", and a length "z" which is distinctly smaller than the with "x". Generally, the channel width "x" of the first-side silicon channel waveguide 64 is so narrow as approximated wavelength of the light, for which reason it is difficult for the first-side silicon channel waveguide 64 to ensure a desirable planarization of the terminal facets. The additional provision of the width-increased incident-side terminal 63 for increasing the light-incident-side width of the first-side channel waveguide for ensuring a desired high optical coupling efficiency to an external optical system.

Figure 12:
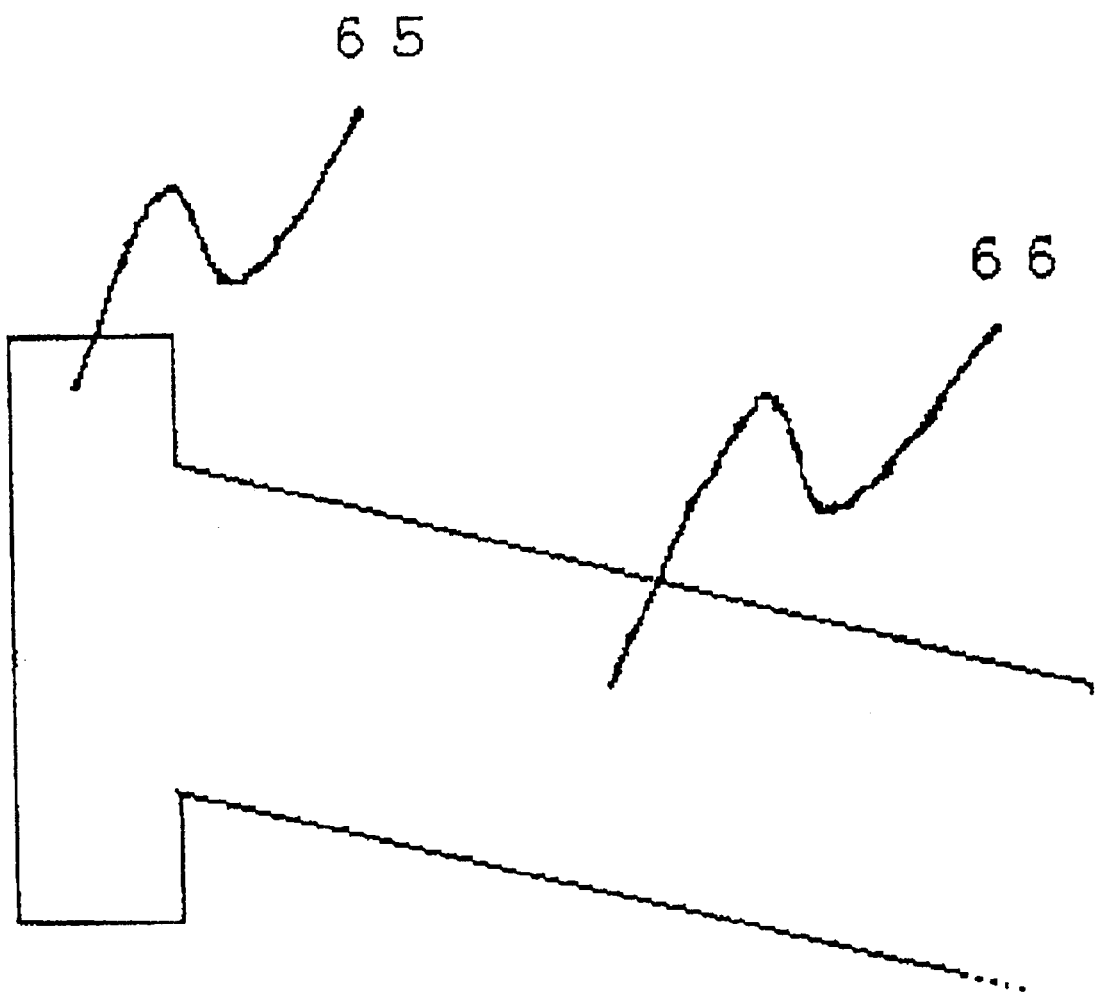
FIG. 12 is a fragmentary enlarged schematic view of another typical example of a width-increased incident-side terminal of the first-side silicon channel waveguide in FIG. 10.

FIG. 12 is a fragmentary enlarged schematic view of another typical example of a width-increased incident-side terminal of the first-side silicon channel waveguide in FIG. 10. A first-side silicon channel waveguide 66 is connected at a tilting angle to a width-increased incident-side terminal 65 which has a width distinctly larger than the with of the first-side silicon channel waveguide 66. The width-increased incident-side terminal 65 has a length distinctly smaller than the with of the first-side silicon channel waveguide 66. The tilting angle of the width-increased incident-side terminal 65 provides an incident-side facet just vertical to a propagation direction of the incident light, even this propagation direction is tilted from the longitudinal direction of the first-side silicon channel waveguide 66 or the propagation direction in the first-side silicon channel waveguide 66. The incident-side facet just vertical to the propagation direction is effective to suppress any undesired optical scattering for obtaining a high optical coupling.

With reference back to FIG. 10, The arrayed plural second-side channel waveguides 60 have a common terminal structure 59.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An optical lens having:
   a wave number distribution-surface having a section where an angular frequency is constant, and said section having a shape which generally represents at least a part of an ellipse or a circle;
   a group-velocity at a point on said section being directed toward an inside of said section to allow a medium of said lens to exhibit a lens effect; and
   at least a first focusing point at an inside position of said lens,
   wherein said lens has a finite thickness which is defined by a distance between two parallel planarized surfaces of said medium, and said lens also has at least a second focusing point at an outside position of said lens.

2. The optical lens as claimed in claim 1, wherein said lens comprises a photonic crystal having a periodic variation in dielectric constant, and said photonic crystal operates in an operative range including a specific angular frequency which is specified at a crossing point between a first wave number distribution curve of said photonic crystal and a second wave number distribution curve of a peripheral medium, in which said photonic crystal and an objective entity exist.

3. The optical lens as claimed in claim 2, wherein said operative range is defined between ±15% from said specific angular frequency of said photonic crystal.

4. The optical lens as claimed in claim 1, wherein said lens is so adopted that a ratio of a short axis to a long axis of said section to vary depending upon wavelength frequency.

5. The optical lens as claimed in claim 2, wherein said photonic crystal has a structure selected from the group consisting of a triangular lattice structure, a primitive cubic lattice structure, a face-centered cubic lattice structure, a body-centered cubic lattice structure and modified-structures thereof.

6. The optical lens as claimed in claim 5, wherein said structure includes a slab-structure.

7. The optical lens as claimed in claim 5, wherein said structures have a unidirectional compression in lattice structure.

8. The optical lens as claimed in claim 5, wherein said structures have a unidirectional extension in lattice structure.

9. An optical wavelength demultiplexer including:
- at least an optical lens having:
  - a wave number distribution-surface having a section where an angular frequency is constant, and said section having a shape which generally represents at least a part of an ellipse or a circle;
  - a group-velocity at a point on said section being directed toward an inside of said section to allow a medium of said lens to exhibit a lens effect;
  - a finite thickness defined by a distance between two parallel planarized surfaces of said medium;
  - a first focusing point at an inside position of said lens; and
  - a second focusing point at an outside position of said lens,
- at least a first-side waveguide positioned in a first-side of said lens for incidence of a wavelength-multiplexed optical signal into said lens; and
- a plurality of second-side waveguide so aligned in a second-side of said lens that terminals of said plurality of second-side waveguide are positioned at respective focusing points of respectively different-wavelength components included in said wavelength-multiplexed optical signal.

10. The optical wavelength demultiplexer as claimed in claim 9, further including at least a prism interposed between said lens and said plurality of second-side waveguide.

11. The optical wavelength demultiplexer as claimed in claim 9, wherein each of said at least a first-side waveguide and said plurality of second-side waveguides includes a non-terminal region, a first terminal region optically coupled to said lens and a second terminal region opposite to said first terminal region and optically coupled to an external optical system, and said first terminal region is larger in sectioned size than said non-terminal region.

12. The optical wavelength demultiplexer as claimed in claim 11, wherein a length of said first terminal region is smaller than a width of said non-terminal region.

13. The optical wavelength demultiplexer as claimed in claim 11, wherein said first terminal region has a facet tilting from a plane vertical to a longitudinal direction of said non-terminal region.

14. The optical wavelength demultiplexer as claimed in claim 11, wherein said first terminal region has a facet included in a plane vertical to a longitudinal direction of said non-terminal region.

15. The optical wavelength demultiplexer as claimed in claim 11, wherein said plurality of second-side waveguides has a single-continuous structure including said respective first terminal regions of said plurality of second-side waveguides.

16. The optical wavelength demultiplexer as claimed in claim 11, wherein said second terminal region is larger in sectioned size than said non-terminal region.

17. The optical wavelength demultiplexer as claimed in claim 16, wherein a length of said second terminal region is smaller than a width of said non-terminal region.

18. The optical wavelength demultiplexer as claimed in claim 16, wherein said second terminal region has a facet tilting from a plane vertical to a longitudinal direction of said non-terminal region.

19. The optical wavelength demultiplexer as claimed in claim 16, wherein said second terminal region has a facet included in a plane vertical to a longitudinal direction of said non-terminal region.

20. The optical wavelength demultiplexer as claimed in claim 16, wherein said plurality of second-side waveguides has a single-continous structure including said respective second terminal regions of said plurality of second-side waveguides.

21. The optical wavelength demultiplexer as claimed in claim 9, wherein said lens comprises a photonic crystal having a periodic variation in dielectric constant, and said photonic crystal operates in an operative range including a specific angular frequency which is specified at a crossing point between a first wave number distribution curve of said photonic crystal and a second wave number distribution curve of a peripheral medium, in which said photonic crystal and an objective entity exist.

22. The optical wavelength demultiplexer as claimed in claim 21, wherein said operative range is defined between ±15% from said specific angular frequency of said photonic crystal.

23. The optical wavelength demultiplexer as claimed in claim 9, wherein said lens is so adopted that a ratio of a short axis to a long axis of said section to vary depending upon wavelength frequency.

24. The optical wavelength demultiplexer as claimed in claim 21, wherein said photonic crystal has a structure selected from the group consisting of a triangular lattice structure, a primitive cubic lattice structure, a face-centered cubic lattice structure, a body-centered cubic lattice structure and modified-structures thereof.

25. The optical wavelength demultiplexer as claimed in claim 24, wherein said structure includes a slab-structure.

26. The optical wavelength demultiplexer as claimed in claim 24, wherein said structures have a unidirectional compression in lattice structure.

27. The optical wavelength demultiplexer as claimed in claim 24, wherein said structures have a unidirectional extension in lattice structure.

28. An optical wavelength demultiplexer/multiplexer including:
- at least an optical lens having:
  - a wave number distribution-surface having a section where an angular frequency is constant, and said section having a shape which generally represents at least a part of an ellipse or a circle;
  - a group-velocity at a point on said section being directed toward an inside of said section to allow a medium of said lens to exhibit a lens effect;
  - a finite thickness defined by a distance between two parallel planarized surfaces of said medium;
  - a first focusing point at an inside position of said lens; and
  - a second focusing point at an outside position of said lens,
- at least a first-side waveguide positioned in a first-side of said lens for incidence of a wavelength-multiplexed optical signal into said lens; and
- a plurality of second-side waveguides so aligned in a second-side of said lens that terminals of said plurality of second-side waveguides are positioned at respective focusing points at respectively different-wavelength components included in said wavelength-multiplexed optical signal.

29. A variable-wavelength selecting optical filter including:

at least an optical lens having:
- a wave number distribution-surface having a section where an angular frequency is constant, and said section having a shape which generally represents at least a part of an ellipse or a circle;
- a group-velocity at a point on said section being directed toward an inside of said section to allow a medium of said lens to exhibit a lens effect;
- a finite thickness defined by a distance between two parallel planarized surfaces of said medium;
- a first focusing point at an inside position of said lens; and
- a second focusing point at an outside position of said lens, at least a first-side waveguide positioned in a first-side of said lens for incidence of a wavelength-multiplexed optical signal into said lens;

a plurality of second-side waveguides sa aligned in a second-side of said lens that terminals of said plurality of second-side waveguides are positioned at respective focussing points at respectively different-wavelength components included in said wavelength-multiplexed optical signal; and a mechanism for actively varying said respective focussing points for wavelength selection.

* * * * *